(12) United States Patent
Warburton (10) Patent No.: US 11,405,591 B2
(45) Date of Patent: Aug. 2, 2022

(54) REMOTE TEST WITNESSING (71) Applicant: GOODRICH CORPORATION, Charlotte, NC (US)

(72) Inventor: Gary Warburton, Oakville (CA)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 17/066,175

(22) Filed: Oct. 8, 2020

(65) Prior Publication Data

US 2022/0038660 A1 Feb. 3, 2022

Related U.S. Application Data

(60) Provisional application No. 63/060,539, filed on Aug. 3, 2020.

(51) Int. Cl.
*H04N 7/18* (2006.01)
*H04N 5/247* (2006.01)
*H04N 5/268* (2006.01)
*H04N 7/15* (2006.01)

(52) U.S. Cl.
CPC .............. *H04N 7/181* (2013.01); *H04N 5/247* (2013.01); *H04N 5/268* (2013.01); *H04N 7/15* (2013.01)

(58) Field of Classification Search
CPC ....................................... H04N 7/181
See application file for complete search history.

(56) References Cited

U.S. PATENT DOCUMENTS

| 4,965,819 A * | 10/1990 | Kannes | H04N 7/142 348/14.07 |
| 7,617,063 B2 | 11/2009 | Tiegs | |
| 2005/0128283 A1* | 6/2005 | Bulriss | H04N 7/147 348/14.1 |
| 2006/0238375 A1* | 10/2006 | Gomez | H04N 7/181 340/945 |
| 2010/0026811 A1* | 2/2010 | Palmer | G08B 13/196 348/159 |

(Continued)

FOREIGN PATENT DOCUMENTS

| JP | 2003087417 | 3/2003 |
| JP | 2020026319 | 2/2020 |

OTHER PUBLICATIONS

Espacenet, English Translation of Abstract of Patent JP2003087417A.

*Primary Examiner* — Daniel T Tekle
(74) *Attorney, Agent, or Firm* — Snell & Wilmer L.L.P.

(57) ABSTRACT

A system may comprise a main host device; a first splitter having a first input port, a first output port, and a second output port, the first input port configured for electronic communication with the main host device; a first local display monitor configured for electronic communication with the first output port of the first splitter; a first video capture device configured for electronic communication with the second output port of the first splitter; a multi-cam switch having a plurality of input ports and an outlet port; a second splitter having a second input port, a third output port, and a fourth output port, the outlet port of the multi-cam switch configured for electronic communication with the second input port; and a second video capture device configured for electronic communication with the third output port.

18 Claims, 6 Drawing Sheets

(56) References Cited

U.S. PATENT DOCUMENTS

| | | | |
|---|---|---|---|
| 2011/0292207 A1* | 12/2011 | Bae | H04N 7/181 |
| | | | 348/143 |
| 2013/0169801 A1* | 7/2013 | Martin | H04N 7/181 |
| | | | 348/143 |
| 2014/0029930 A1* | 1/2014 | Lai | H04N 5/232 |
| | | | 396/263 |
| 2017/0230615 A1* | 8/2017 | Feng | G06Q 10/10 |

* cited by examiner

REMOTE TEST WITNESSING

CROSS-REFERENCE TO RELATED APPLICATIONS

This application is a non-provisional of, and claims priority to and the benefit of, U.S. Provisional Application No. 63/060,539, titled "REMOTE TEST WITNESSING," filed on Aug. 3, 2020, which is hereby incorporated by reference in its entirety.

TECHNICAL FIELD

The present disclosure relates to qualification and development testing, and in particular to remote test systems and methods.

BACKGROUND

Qualification and development testing for aircraft systems, such as gas turbine engines, landing gear systems, or the like typically have a live test witness. The performance of qualification and development testing will often have witnessing of the test by designated officials and responsible engineering personnel during the operation of the test. These witnesses often result in special travel arrangements having to be made to ensure personnel can be present during the operation of the test. With issues such as global pandemics and cost saving initiatives, local witness may not remain feasible or cost effective.

SUMMARY

A system is disclosed herein. The system may comprise: a main host device; a first splitter having a first input port, a first output port, and a second output port, the first input port configured for electronic communication with the main host device; a first local display monitor configured for electronic communication with the first output port of the first splitter; a first video capture device configured for electronic communication with the second output port of the first splitter; a multi-cam switch having a plurality of input ports and an outlet port; a second splitter having a second input port, a third output port, and a fourth output port, the outlet port of the multi-cam switch configured for electronic communication with the second input port; and a second video capture device configured for electronic communication with the third output port.

In various embodiments, the system may further comprise a second local display monitor in electronic communication with the fourth output port. The electronic communication between the second output port and the first video capture device may be unidirectional from the second output port to the first video capture device. The system may further comprise a plurality of cameras, each camera in electronic communication with a respective input port in the plurality of input ports of the multi-cam switch. The main host device may comprise a controller and a graphics port. The graphics port may be in electronic communication with the first input port. The controller may be operable to command the multi-cam switch to provide a video output of a selected camera from a plurality of cameras. The system may further comprise a first host device having the first video capture device and a second host device having the second video capture device. The system may further comprise a network configured to transmit a first video output from the first host device and a second video output from the second host device to a witness device.

A remote test witnessing system is disclosed herein. The remote test witnessing system may further comprise: a main host device having a graphics port; a first host device having a first video capture device; a first host monitor; a remote witness device; a first splitter having a first input port in electronic communication with the graphics port, a first output port in electronic communication with the first host monitor, and a second output port in electronic communication with the first video capture device; and a network having a web-based video conferencing tool configured to share a first video output with test parameters from a qualification or development test of an aircraft system from the graphics port, through the first host device, and to the remote witness device.

In various embodiments, the remote test witnessing system may further comprise: a second host device having a second video capture device; a multi-cam switch having a plurality of input ports and an outlet port; a second splitter having a second input port in electronic communication with the multi-cam switch, a third output port in electronic communication with the second video capture device, and a fourth output port. The remote test witnessing system may further comprise a second host monitor in electronic communication with the fourth output port. The web-based video conferencing tool may be further configured to share a second video output of the multi-cam switch through the second host device and to the remote witness device. The remote test witnessing system may further comprise a plurality of cameras, each camera in electronic communication with a respective input port in the plurality of input ports of the multi-cam switch. The main host device may comprise a controller. The controller may be operable to command the multi-cam switch to provide a video output of a selected camera from a plurality of cameras. The second output port is in unidirectional electronic communication with the first video capture device from the second output port to the first video capture device. The third output port may be in unidirectional electronic communication with the second video capture device from the second output port to the first video capture device.

A method of assembling a remote test witnessing system is disclosed herein. The method may comprise: electronically coupling a main host device to an input port of a first splitter, the main host device in electronic communication with a test cell for an aircraft component; electronically coupling a first local monitor to a first output port of the first splitter; electronically coupling a first video capture device to a second output port of the first splitter, the first video capture device coupled to a first host device; and initiating, by a processor, a web-based video conference between the first host device and a remote witness device, the web-based video conference shares, via the processor, a first video output from the main host device through the first host device and the web-based video conference to the remote witness device.

In various embodiments, the method may further comprise: electronically coupling a multi-cam switch to a second input port of a second splitter; and electronically coupling a second video capture device to a third output port of the second splitter, the second video capture device coupled to a second host device. Initiating the web-based video conference may further comprise sharing, via the processor, a second video output from the multi-cam switch through the second host device and the web-based video conference to the remote witness device. The method may further comprise transmitting, via the processor, the first video output and the second video output over a network to the remote witness device.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Referring now to FIGS. 1-6, the process flows depicted are merely embodiments and are not intended to limit the scope of the disclosure. For example, the steps recited in any of the method or process descriptions may be executed in any suitable order and are not limited to the order presented. It will be appreciated that the following description makes appropriate references not only to the steps and user interface elements depicted in FIGS. 1-6, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general-purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program and loaded into a computer system using a removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on, a processing apparatus executing upgraded software, a stand-alone system, a distributed system, a method, a data processing system, a device for data processing, and/or a computer program. Accordingly, any portion of the system or a module may take the form of a processing apparatus executing code, an internet-based embodiment, an entirely hardware embodiment, or an embodiment combining aspects of the internet, software, and hardware. Furthermore, the system may take the form of a computer program on a computer-readable storage medium having computer-readable program code means embodied in the storage medium. Any suitable computer-readable storage medium may be utilized, including solid state storage, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, Android, iOS, Windows Mobile, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

Exemplary systems and methods may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, and the like, which may carry out a variety of functions under the control of one or more microprocessors or other control devices. Similarly, the software elements of the system may be implemented with any programming or scripting language such as C, C++, C#, JAVA, JAVASCRIPT, JAVASCRIPT Object Notation (JSON), VBScript, Macromedia COLD FUSION, COBOL, MICROSOFT company's Active Server Pages, assembly, PERL, PHP, PYTHON, Visual Basic, SQL Stored Procedures, PL/SQL, or any UNIX shell script with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent use issues with a client-side scripting language, such as JAVASCRIPT, VBScript, or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Exemplary systems and methods may be described herein with reference to screen shots, block diagrams and flowchart illustrations of methods, apparatus, and computer program according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system or methods associated therewith.

Figure 1:
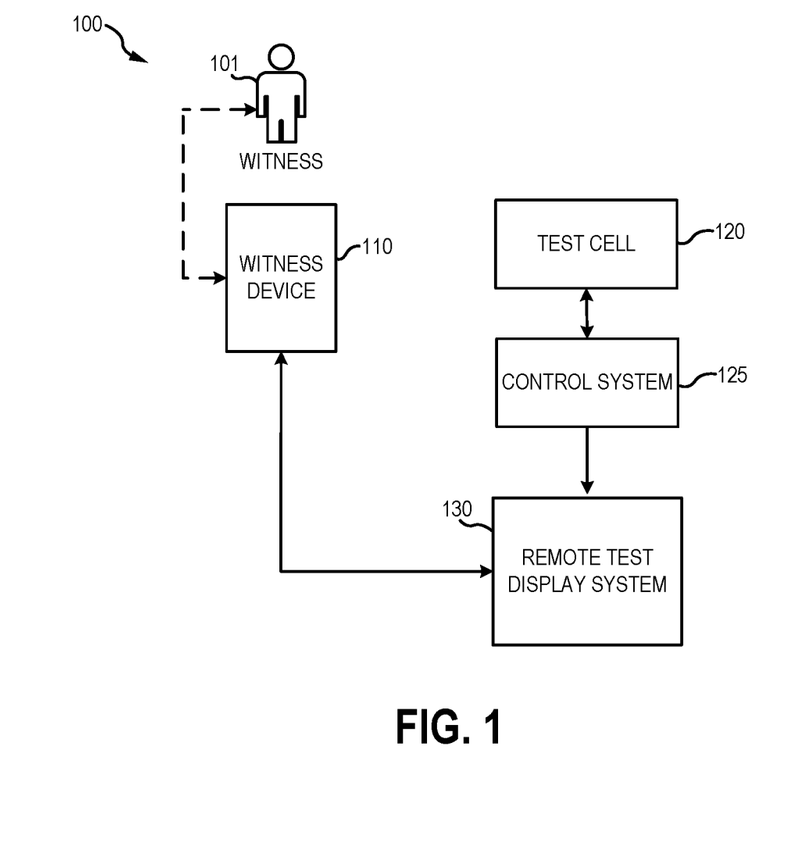
FIG. 1 illustrates a schematic view of a remote test witnessing system, in accordance with various embodiments.

In various embodiments, and with reference to FIG. 1, a system 100 for remote viewing of qualification and/or development testing by a witness 101 (e.g., a remote witness testing system) is illustrated. System 100 may allow a testing witness (e.g., witness 101) to view a qualification and/or development test remotely without significant degradation, lag, and/or delay. System 100 may comprise a witness device 110, a test cell 120, a control system 125, and a remote test display system 130. System 100 may be utilized by a test witness (e.g., witness 101) utilizing the internet and communicating through a network, such as Zoom.gov, Skype®, or any other video sharing network/platform.

In various embodiments, witness 101 may desire witnessing a qualification and/or development test for an aircraft component or system, such as a landing gear system, a gas turbine engine, or the like. A witness 101 may be desired during operation of the testing of the aircraft component to ensure testing is performed correctly, proper metrics are obtained, etc. Typical testing witnesses include on site travel for a respective witness, which may be costly (i.e., special travel arrangements may occur to ensure personnel may be present during operation of the test.

In various embodiments, a control system 125 is in operable communication with a test cell 120. In this regard, the control system 125 is configured to provide test inputs to the test cell. For example, for a landing gear test, the control system 125 may provide test inputs to a test rig for a drop test, strength test, fatigue test, environment test, or any other test known in the art. In various embodiments the control system 125 may include a non-networked computer. The non-networked computer may be local and electrically coupled to testing components of a respective test rig in the test cell 120, sensor(s) coupled to the tested component, and any other component of a typical aircraft component test.

In various embodiments, the control system 125 may be in electrical communication with the remote test display system 130. The control system 125 may be in one-way communication with the remote test display system 130. In this regard, due to the complex nature of the control system 125, components of the control system 125 are kept isolated from networks and thus the output from control system 125 may not be directly shared with external parties in a remote environment. Thus, the remote test display system 130 is configured to provide a video output only (e.g., with no external control by the witness 101) of test parameters and/or camera(s) focused on the tested component, in accordance with various embodiments.

In various embodiments, witness device 110 may comprise various hardware, software, and/or database components configured to enable witness device 110 to participate in system 100 and allow the witness 101 to view the testing parameters and/or the tested component during operation of the test. For example, witness device 110 may be computer based, and may comprise a processor, a tangible non-transitory computer-readable memory, and/or a network interface, along with other suitable system software and hardware components. Instructions stored on the tangible non-transitory memory may allow witness device 110 to perform various functions, as described herein. The processor may include any logic device such as one or more of a central processing unit (CPU), an accelerated processing unit (APU), a digital signal processor (DSP), a field programmable gate array (FPGA), an application specific integrated circuit (ASIC), or the like.

In accordance with various embodiments, remote test display system 140 may be configured to transmit display, via a network or the like, of various parameters seen by a test engineer during testing of the aircraft component and/or transmit video display of at least one test camera during testing of the aircraft component.

Figure 2:
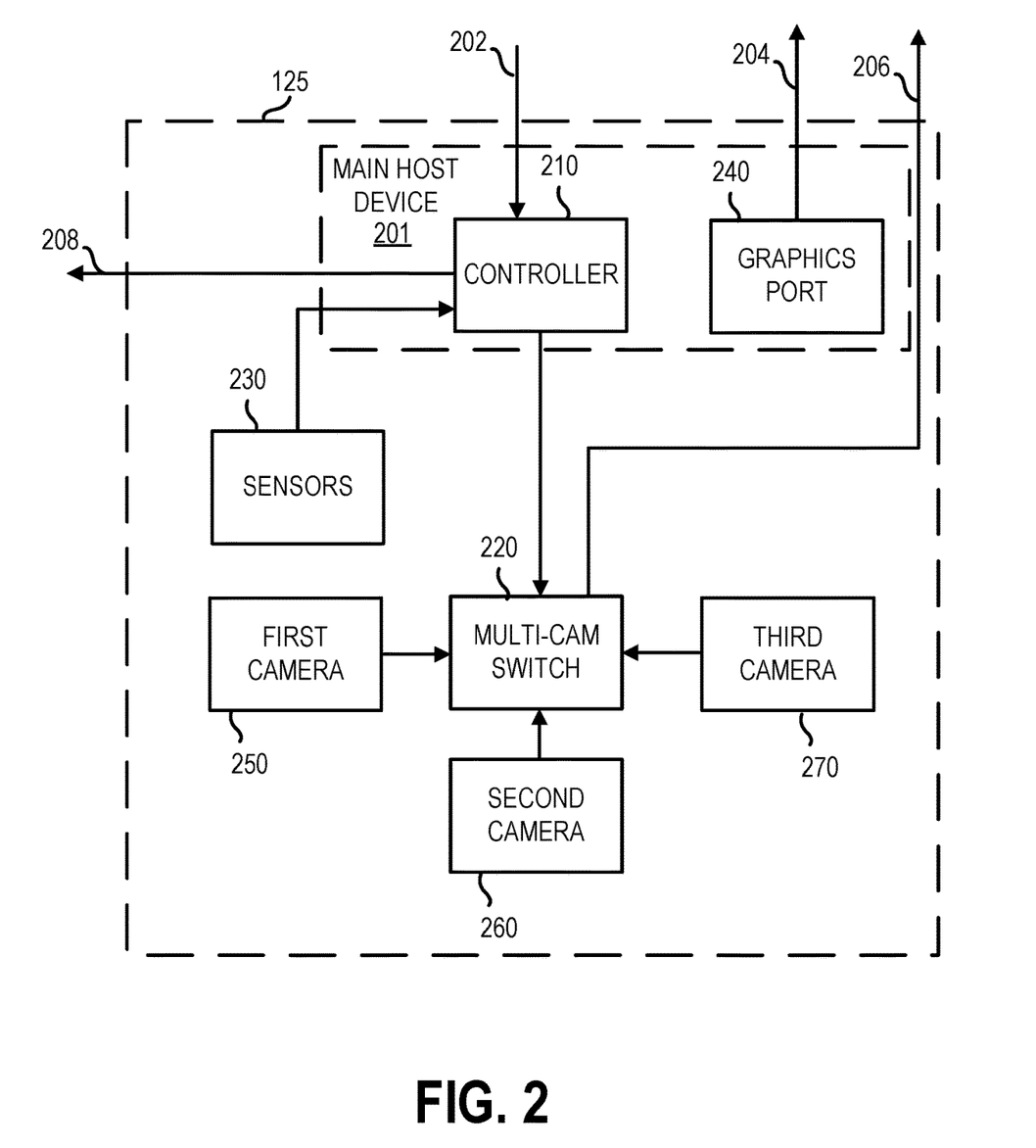
FIG. 2 illustrates a control system for use in a remote test witnessing system, in accordance with various embodiments.

Referring now to FIG. 2, a schematic view of the control system 125 from FIG. 1 is illustrated in accordance with various embodiments. Control system 125 may comprise a controller 210, a multi-cam switch 220, sensor(s) 230, a graphics port 240, a first camera 250, a second camera 260, and/or a third camera 270. Although illustrated as comprising three cameras, any number of cameras are within the scope of this disclosure. Controller 210 may comprise at least one computing device in the form of a computer or processor, or a set of computers/processors, although other types of computing units or systems may be used. In various embodiments, controller 210 may be implemented as and may include one or more processors and/or one or more tangible, non-transitory memories and be capable of implementing logic. Each processor may be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 210 may comprise a processor configured to implement various logical operations in response to execution of instructions, for example, instructions stored on a non-transitory, tangible, computer-readable medium configured to communicate with controller 210. In various embodiments, controller 210 may be integrated into computer systems at a test site, such as, for example an aircraft component test site.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Controller 210 may be in electronic communication with sensors 230, graphics port 240, and/or multi-cam switch 220. In various embodiments, controller 210 may be configured to receive test inputs (e.g., a command signal 202) from a test control device. In this regard, a test engineer may provide inputs to a respective test rig in a test cell, which may be implemented through the controller 210 and provided as test outputs 208. Similarly, controller 210 may be in operable communication with sensors 230 disposed at, or proximate the component being tested in test cell 120 from FIG. 1. In this regard, the controller 210 may be configured to vary test outputs 208 in response to measurements from sensors 230.

In various embodiments, the graphics port 240 is in electronic communication with a host monitor or the like. In this regard, the graphics port 240 may provide an output signal 204 configured to display a user interface on a host computer and to be transmitted over a network for viewing by a witness 101 from FIG. 1, as described further herein. In various embodiments, the graphics port 240 may be any graphics port known in the art, such as a video graphics array, a digital video interface (DVI), an HDMI interface, a DisplayPort, or the like. In various embodiments, the graphics port 240 is an HDMI interface. In various embodiments, a test engineer may send a command signal 202 via the host monitor, or the like to the controller 210 in order to control the testing procedure for a respective aircraft component. In this regard, a command signal 202 may be supplied to controller 210 instructing controller 210 to provide test outputs to test cell 120 from FIG. 1.

In various embodiments, the control system 125 comprises a main host device 201 including the controller 210 and the graphics port 240. In various embodiments, the main host device 201 may comprise various hardware, software, and/or database components configured to enable main host device 201 to control testing via control system 125 and participate in system 100, allowing the witness 101 to view the testing parameters and/or the tested component during operation of the test. For example, main host device 201 may be computer based, and may comprise a processor, a tangible non-transitory computer-readable memory, and/or a network interface, along with other suitable system software and hardware components. Instructions stored on the tangible non-transitory memory may allow main host device 201 to perform various functions, as described herein. The processor may include any logic device such as one or more of a central processing unit (CPU), an accelerated processing unit (APU), a digital signal processor (DSP), a field programmable gate array (FPGA), an application specific integrated circuit (ASIC), or the like Referring now to FIGS. 2 and 3, the output signal 204 from the graphics port 240 may be in electronic communication with a first splitter 310. In various embodiments, the first splitter 310 may comprise any type of splitter, such as a coaxial cable splitter, a switch splitter, a vertical splitter, or a High Definition Multimedia Interface (HDMI) splitter. In various embodiments, the first splitter 310 is an HDMI splitter. An HDMI splitter may provide less degradation relative to typical splitters and/or a higher resolution relative to typical splitters, in accordance with various embodiments. In various embodiments, the first splitter 310 comprises an input port in communication with the output signal 204 of graphics port 240, a first output port in electronic communication with a local monitor 320, and a second output port in electronic communication with a first video capture device 330.

Figure 3:
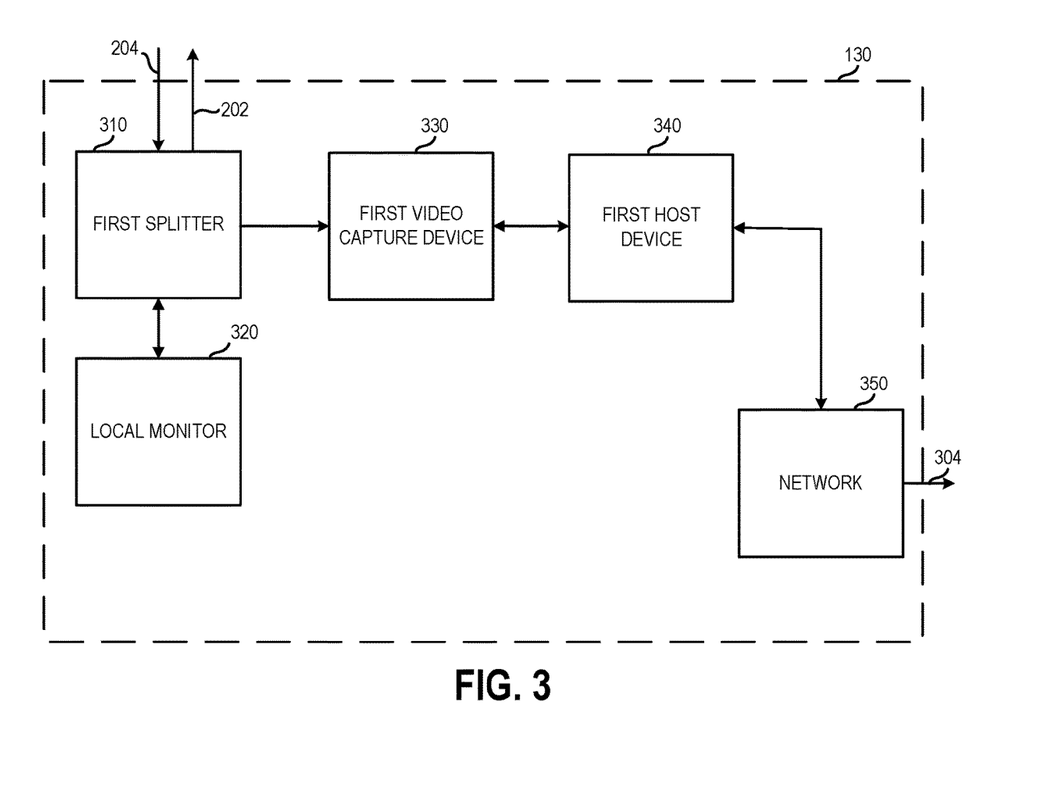
FIG. 3 illustrates a portion remote test display system for use in a remote test witnessing system, in accordance with various embodiments.

In various embodiments, the first splitter 310 is in electronic communication with a local monitor 320. In various embodiments, the local monitor 320 is for display only for a test engineer, or the like. In various embodiments, the local monitor 320 may act as the host monitor as described previously. In this regard, the local monitor 320 may be in bidirectional communication with the first splitter and configured to send a command signal 202 to controller 210, in accordance with various embodiments.

In various embodiments, the first splitter 310 is in unidirectional communication with a first video capture device 330. In this regard, parameters from testing that are being controlled on the local monitor 320 and communicated via command signal 202 may not be controlled from any components downstream of the first video capture device 330. In various embodiments, the first video capture device 330 may be any video capture device, such as a serial digital interface capture cart, an industry standard architecture analog video capture card, a universal serial bus (USB) capture device, or an HDMI video capture device. In various embodiments, the first video capture device 330 comprises an HDMI video capture device, a USB video capture device, or a combination of the two.

In various embodiments, the video capture device is in electronic communication with a first host device 340. In various embodiments, first host device 340 may comprise various hardware, software, and/or database components configured to enable first host device 340 to participate in system 100 from FIG. 1 and allow the witness 101 to view the testing parameters and/or the tested component during operation of the test. For example, first host device 340 may be computer based, and may comprise a processor, a tangible non-transitory computer-readable memory, and/or a network interface, along with other suitable system software and hardware components. Instructions stored on the tangible non-transitory memory may allow first host device 340 to perform various functions, as described herein. The processor may include any logic device such as one or more of a central processing unit (CPU), an accelerated processing unit (APU), a digital signal processor (DSP), a field programmable gate array (FPGA), an application specific integrated circuit (ASIC), or the like. In various embodiments, the first host device 340 is in communication with a network 350 configured to transmit a respective video signal from first video capture device 330 of the parameters from testing the aircraft component/system, as described previously herein.

In various embodiments, the network 350 may be any server known to transmit video from a first device to a second device. For example, the network 350 may comprise any web-based video conferencing tool, such as ZOOM.gov, SKYPE®, or the like. In various embodiments, the network 350 may transmit the video signal from first host device 340 through network 350 to witness device 110 from FIG. 1, in accordance with various embodiments.

Referring back to FIG. 2, in various embodiments, the test engineer may further provide a command signal 202 to controller 210 to switch between cameras 250, 260, 270 via multi-cam switch 220, as described further herein. Thus, in various embodiments, based on a respective test being performed, the test engineer may switch a video display to first camera 250, second camera 260, or third camera 270. In various embodiments, multi-cam switch 220 may output a selected camera (e.g., first camera 250, second camera 260, or third camera 270) based on instructions from controller 210 via an output signal 206. In various embodiments, the cameras 250, 260, 270 may be any video camera. In various embodiments, the cameras 250, 260, 270 may each comprise a high definition digital camera. In various embodiments, multi-cam switch may comprise any electrical switch, such as an HDMI switch. In various embodiments, a "switch" as referred to herein, refers to an electrical device with multiple video inputs and a single video output, where the device is configured to switch the video output to a selected video input of the multiple video inputs.

Figure 4:
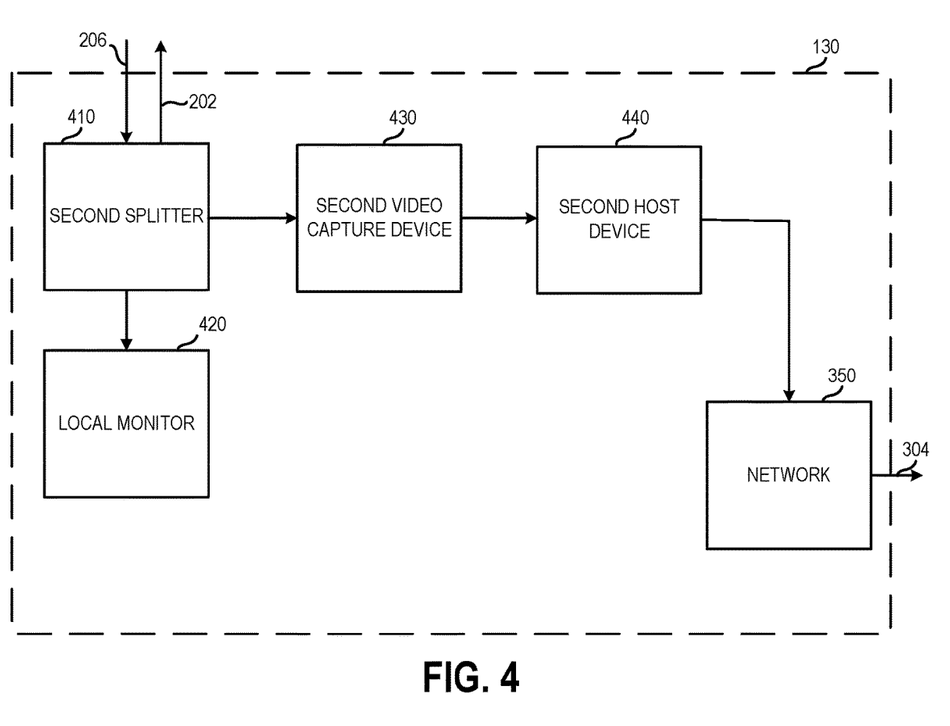
FIG. 4 illustrates a portion of a remote test display system for use in a remote test witnessing system, in accordance with various embodiments.

Referring now to FIGS. 2 and 4, the output signal 206 from multi-cam switch 220 may be in electronic communication with second splitter 410. In various embodiments, the second splitter 410 may be in accordance with the first splitter 310. In various embodiments, the second splitter 410 may be in communication with a local monitor 420 and a second video capture device 430. In various embodiments, local monitor 420 may be a separate monitor for a test engineer, or the like, to view cameras 250, 260, 270. In various embodiments, local monitor 420 may be local monitor 320 and both the parameters and a selected camera may be viewed by a test engineer in a side by side manner. The present disclosure is not limited in this regard.

In various embodiments, the second video capture device 430 is in accordance with the first video capture device 330. In various embodiments, the second splitter 410 is in unidirectional communication with the second video capture device 430. In this regard, parameters from testing that are being controlled on the local monitor 420 and communicated via command signal 202 may not be controlled from any components downstream of the second video capture device 430.

In various embodiments, the second video capture device 430 is in electronic communication with a second host device 440. In various embodiments, second host device 440 may comprise various hardware, software, and/or database components configured to enable second host device 440 to participate in system 100 from FIG. 1 and allow the witness 101 to view the cameras 250, 260, 270 from FIG. 2, as the test engineer sees them during operation of a respective development or qualification test. For example, second host device 440 may be computer based, and may comprise a processor, a tangible non-transitory computer-readable memory, and/or a network interface, along with other suitable system software and hardware components. Instructions stored on the tangible non-transitory memory may allow first host device 340 to perform various functions, as described herein. The processor may include any logic device such as one or more of a central processing unit (CPU), an accelerated processing unit (APU), a digital signal processor (DSP), a field programmable gate array (FPGA), an application specific integrated circuit (ASIC), or the like. In various embodiments, the second host device 440 is in communication with the network 350 configured to transmit a respective video signal from second video capture device 430 of a selected camera from the group of first camera 250, second camera 260, and third camera 270 from FIG. 2.

Figure 5:
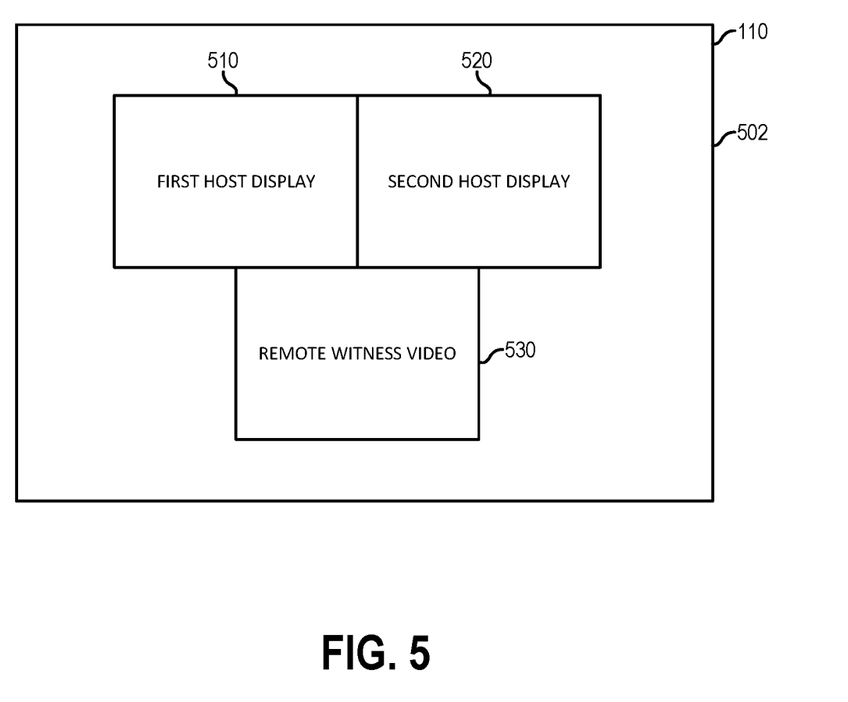
FIG. 5 illustrates a display of a witness device, in accordance with various embodiments.

Referring now to FIG. 5, a display screen 502 of a witness device 110, in accordance with various embodiments is illustrated. In various embodiments, the first host display 510 may display the video of the parameters captured from the first video capture device 330, transmitted to the first host device 340, and further transmitted over network 350 to the witness device 110. Similarly, the second host display 520 may display the video of a selected camera (e.g., first camera 250, second camera 260, or third camera 270 from FIG. 2) based on an input from a local test engineer. In this regard, a testing witness (e.g., witness 101 from FIG. 1) may witness a development and/or qualification test of an aircraft component or system remotely and see what the test engineer onsite is viewing.

Although illustrated as including a first host device 340 and a second host device 440, any number of host devices configured to display various cameras, parameters, or the like that a test engineer will be seeing is within the scope of this disclosure. In various embodiments, control of control system 125 may be limited to local control and hard wired due to the complex nature of the testing system. In this regard, the remote test display system 130 is configured to use a first splitter 310 to split a video output signal (e.g., output signal 204) from the control system 125 between the local monitor 320 and the first video capture device 330. In various embodiments, the first video capture device 330 may be installed on first host device 340. Similarly, in various embodiments, the second video capture device 430 may be installed on second host device 440.

Figure 6:
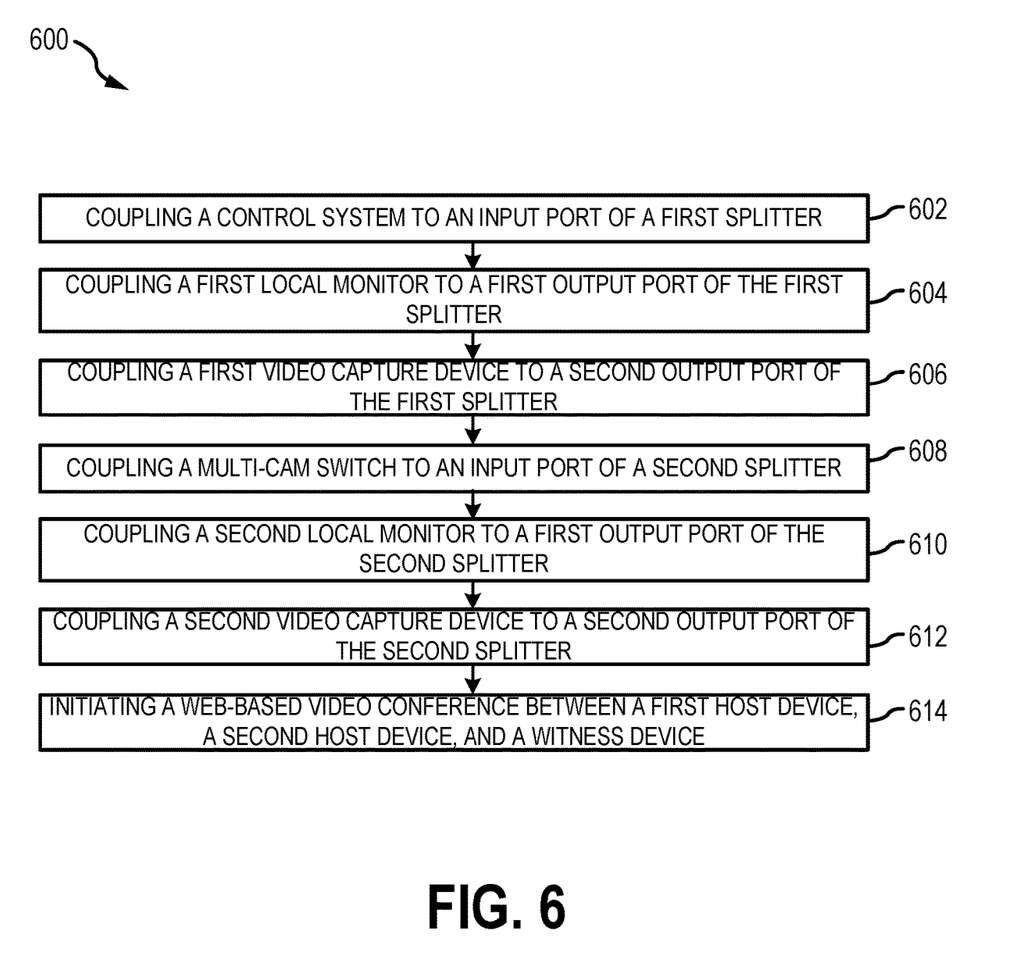
FIG. 6 illustrates a method of assembling a remote test witnessing system, in accordance with various embodiments.

Referring now to FIG. 6, a method of assembling a remote witness testing system is illustrated, in accordance with various embodiments. In various embodiments, the method 600 comprises coupling a control system to an input port of a first splitter (step 602). In various embodiments, the control system may comprise a host server, or the like. In various embodiments, the control system may be in accordance with control system 125 from FIGS. 1 and 2 and the first splitter may be in accordance with first splitter 310 from FIG. 3. In various embodiments, "coupling" as referred to in method 600 refers to electronically coupling (either via a remote network or directly). In various embodiments, step 602 may include direct electronic coupling of the control system to the input port of the first splitter.

The method 600 further comprises coupling a first local monitor to a first output port of the first splitter (step 604). The first local monitor may be for use by a test engineer, an engineer representative, a test host, or the like. In various embodiments, the local monitor may be used as a user interface to provide test inputs into the control system for the test cell.

The method 600 further comprises coupling a first video capture device to a second output port of the first splitter (step 606). In various embodiments, the first video capture device may be integral to a first host device. In various embodiments, the host device may comprise a laptop, or the like.

The method 600 further comprises coupling a multi-cam switch to an input port of a second splitter (step 608). In various embodiments, the multi-cam switch is in electronic communication with at least two cameras. In this regard, the multi-cam switch may be configured to switch between cameras based on a desire to view one of the specific cameras.

The method 600 further comprises coupling a second local monitor to a first output of the second splitter (step 610) and coupling a second video capture device to a second output port of the second splitter (step 612). In various embodiments, the second video capture device may be integral to a first host device. In various embodiments, the host device may comprise a laptop, or the like.

In various embodiments, the method 600 further comprises initiating a web-based video conference between the first host device, the second host device, and a witness device (step 614). In this regard, the first host device may be configured to display the video output from the computer system, and the second host device may be configured to display the video output from the multi-cam switch. Thus, in various embodiments, a witness for a qualification or development test of an aircraft component or system may perform his or her duties remotely via the web-based video conference.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, other advantages, and solutions to problems have been described above with regard to various embodiments. However, advantages and solutions to problems, and any element(s) that may cause any advantages or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A system for remote testing at least one of a qualification test or a development test for an aircraft system, comprising:
    a main host device, the main host device including a non-networked control system, the non-networked control system configured to control the at least one of the qualification test or the development test for the aircraft system, the non-networked control system locally and electrically coupled to testing components of a test rig in a test cell, the non-networked control system isolated from a network;
a first splitter having a first input port, a first output port, and a second output port, the first input port configured for electronic communication with the main host device;
a first local display monitor configured for electronic communication with the first output port of the first splitter;
a first video capture device configured for electronic communication with the second output port of the first splitter;
a multi-cam switch having a plurality of input ports and an outlet port, the multi-cam switch in operable communication with a first camera and a second camera, the first camera and the second camera disposed in a test cell;
a second splitter having a second input port, a third output port, and a fourth output port, the outlet port of the multi-cam switch configured for electronic communication with the second input port; and
a second video capture device configured for electronic communication with the third output port.

2. The system of claim 1, further comprising a second local display monitor in electronic communication with the fourth output port.

3. The system of claim 1, wherein the electronic communication between the second output port and the first video capture device is unidirectional from the second output port to the first video capture device.

4. The system of claim 1, further comprising a plurality of cameras, each camera in electronic communication with a respective input port in the plurality of input ports of the multi-cam switch.

5. The system of claim 1, wherein:
the main host device comprises a controller and a graphics port,
the graphics port in electronic communication with the first input port.

6. The system of claim 5, wherein the controller is operable to command the multi-cam switch to provide a video output of a selected camera from a plurality of cameras.

7. The system of claim 1, further comprising a first host device having the first video capture device and a second host device having the second video capture device.

8. The system of claim 7, further comprising a network configured to transmit a first video output from the first host device and a second video output from the second host device to a witness device.

9. A remote test witnessing system, comprising:
a main host device having a graphics port, the main host device including a non-networked control system, the non-networked control system configured to control the qualification test or the development test for the aircraft system, the non-networked control system locally and electrically coupled to testing components of a test rig in a test cell, the non-networked control system isolated from a network;
a first host device having a first video capture device;
a first host monitor;
a remote witness device;
a first splitter having a first input port in electronic communication with the graphics port, a first output port in electronic communication with the first host monitor, and a second output port in electronic communication with the first video capture device;
a network having a web-based video conferencing tool configured to share a first video output with test parameters from a qualification or development test of an aircraft system from the graphics port, through the first host device, and to the remote witness device;
a second host device having a second video capture device;
a multi-cam switch having a plurality of input ports and an outlet port, the multi-cam switch in operable communication with a first camera and a second camera, the first camera and the second camera disposed in a test cell for one of an aircraft component or the aircraft system;
a second splitter having a second input port in electronic communication with the multi-cam switch, a third output port in electronic communication with the second video capture device, and a fourth output port.

10. The remote test witnessing system of claim 9, further comprising a second host monitor in electronic communication with the fourth output port.

11. The remote test witnessing system of claim 9, wherein the web-based video conferencing tool is further configured to share a second video output of the multi-cam switch through the second host device and to the remote witness device.

12. The remote test witnessing system of claim 9, further comprising a plurality of cameras, each camera in electronic communication with a respective input port in the plurality of input ports of the multi-cam switch.

13. The remote test witnessing system of claim 9, wherein:
the main host device comprises a controller,
the controller operable to command the multi-cam switch to provide a video output of a selected camera from a plurality of cameras.

14. The remote test witnessing system of claim 9, wherein the second output port is in unidirectional electronic communication with the first video capture device from the second output port to the first video capture device.

15. The remote test witnessing system of claim 9, wherein the third output port is in unidirectional electronic communication with the second video capture device from the second output port to the first video capture device.

16. A method of assembling and using a remote test witnessing system, comprising:
electronically coupling a main host device to an input port of a first splitter, the main host device in electronic communication with a test cell for an aircraft component;
electronically coupling a first local monitor to a first output port of the first splitter;
electronically coupling a first video capture device to a second output port of the first splitter, the first video capture device coupled to a first host device;
initiating, through a processor, a web-based video conference between the first host device and a remote witness device, wherein the web-based video conference shares, via the processor, a first video output from the main host device through the first host device and the web-based video conference to the remote witness device;
electronically coupling a multi-cam switch to a second input port of a second splitter, the multi-cam switch in communication with a first camera and a second camera, the first camera and the second camera each located in the test cell;

electronically coupling a second video capture device to a third output port of the second splitter, the second video capture device coupled to a second host device;

initiating, through a local non-networked control system, one of a qualification test or a development test for the aircraft component, the non-networked control system locally and electrically coupled to testing components of a test rig in a test cell, the non-networked control system isolated from a network;

witnessing, via the remote witness device, the qualification test or the development test from a remote location, wherein the witnessing includes viewing the first camera in response to a test engineering viewing the first camera locally, and viewing a testing parameter as the testing parameter is being viewed by the test engineer.

17. The method of claim 16, wherein initiating the web-based video conference further comprises sharing, via the processor, a second video output from the multi-cam switch through the second host device and the web-based video conference to the remote witness device.

18. The method of claim 17, further comprising transmitting, via the processor, the first video output and the second video output over a network to the remote witness device.

* * * * *